US012188371B1

(12) United States Patent
Savard et al.

(10) Patent No.: US 12,188,371 B1
(45) Date of Patent: Jan. 7, 2025

(54) TURBINE ROTOR DOVETAIL STRUCTURE WITH SPLINES

(71) Applicant: Pratt & Whitney Canada Corp., Longueuil (CA)

(72) Inventors: Philippe Savard, Montreal (CA); Francois Doyon, Ste-Julie (CA); Guy Lefebvre, St-Bruno (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/452,900

(22) Filed: Aug. 21, 2023

(51) Int. Cl.
*F01D 5/14* (2006.01)

(52) U.S. Cl.
CPC .......... *F01D 5/143* (2013.01); *F05D 2240/24* (2013.01)

(58) Field of Classification Search
CPC ........................................................ F01D 5/143
See application file for complete search history.

(56) References Cited

U.S. PATENT DOCUMENTS

| | | | | |
|---|---|---|---|---|
| 6,095,402 | A | 8/2000 | Brownell et al. | |
| 6,478,545 | B2 * | 11/2002 | Crall | B23K 20/129 29/889.23 |
| 10,294,805 | B2 * | 5/2019 | Potter | F04D 29/321 |
| 10,876,410 | B2 | 12/2020 | Mahle et al. | |
| 2019/0178094 | A1 * | 6/2019 | Schutte | F01D 5/34 |

* cited by examiner

*Primary Examiner* — Sabbir Hasan
(74) *Attorney, Agent, or Firm* — CANTOR COLBURN LLP

(57) ABSTRACT

An integrated blade rotor (IBR) is provided and includes a disc, blades integrally formed with the disc and radially outwardly facing surfaces of the disc. Each radially outwardly facing surface is disposed adjacent to a corresponding blade and includes a curved profile.

20 Claims, 3 Drawing Sheets

TURBINE ROTOR DOVETAIL STRUCTURE WITH SPLINES

BACKGROUND

The present disclosure relates to turbine engine and, more particularly, to a turbine engine with an integrated blade rotor (IBR) in a high-temperature turbine region.

In turbine engines, a turbine is used to generate power for propulsion, in some cases, by turning propellors, fans or helicopter blades through a gearbox. In some instances, the gearbox output is used to power electrical generators. In a gas turbine engine, fuel and compressed oxygen are combusted in a combustor to produce a high-temperature and high-pressure fluid. This fluid enters a turbine and interacts with rows or stages of turbine blades and vanes. This interaction causes the stages of turbine blades to rotate a rotor. The rotor rotation drives a compressor to compress the oxygen for the combustor and, as noted above, can be used to drive operations of a generator to produce electricity or for propulsion.

BRIEF DESCRIPTION

According to an aspect of the disclosure, an integrated blade rotor (IBR) is provided and includes a disc, blades integrally formed with the disc and radially outwardly facing surfaces of the disc. Each radially outwardly facing surface is disposed adjacent to a corresponding blade and includes a curved profile.

In accordance with additional or alternative embodiments, a height of the curved profile is about ⅓ a width of the disc.

In accordance with additional or alternative embodiments, each blade has an airfoil shape and includes leading and trailing edges and pressure and suction surfaces respectively extending between the leading and trailing edges.

In accordance with additional or alternative embodiments, each radially outwardly facing surface is adjacent to the pressure surface of the corresponding blade.

In accordance with additional or alternative embodiments, each radially outwardly facing surface has a concave profile in a circumferential dimension about the disc.

In accordance with additional or alternative embodiments, each radially outwardly facing surface blends tangentially with the leading and trailing edges.

In accordance with additional or alternative embodiments, each radially outwardly facing surface includes a leading edge portion that blends tangentially with a leading edge fillet at a base of the leading edge and a trailing edge portion that blends tangentially with a trailing edge fillet at a base of the trailing edge.

According to an aspect of the disclosure, a gas turbine engine is provided and includes a turbine section in which high-temperature fluid is expanded to generate work and an IBR. The IBR is operably disposed in the turbine section whereby the blades aerodynamically interact with the high-temperature fluid and each radially outwardly facing surface is exposed to a hot gas path.

According to an aspect of the disclosure, an integrated blade rotor (IBR) is provided and includes a disc, blades integrally formed with the disc and radially outwardly facing surfaces of the disc. Each radially outwardly facing surface is disposed adjacent to a corresponding blade and includes leading and trailing wing sections that cooperatively define a cylindrical plane about the disc from which the corresponding blade extends radially outwardly and a curved profile which protrudes radially outwardly from the cylindrical plane along a chord length of the corresponding blade.

In accordance with additional or alternative embodiments, a height the curved profile protrudes from the cylindrical plane is about ⅓ a width of the disc.

In accordance with additional or alternative embodiments, each blade has an airfoil shape and includes leading and trailing edges and pressure and suction surfaces respectively extending between the leading and trailing edges.

In accordance with additional or alternative embodiments, each radially outwardly facing surface is adjacent to the pressure surface of the corresponding blade.

In accordance with additional or alternative embodiments, each radially outwardly facing surface has a concave profile in a circumferential dimension about the disc.

In accordance with additional or alternative embodiments, each radially outwardly facing surface blends tangentially with the leading and trailing edges.

In accordance with additional or alternative embodiments, each radially outwardly facing surface includes a leading edge portion that blends tangentially with a leading edge fillet at a base of the leading edge and a trailing edge portion that blends tangentially with a trailing edge fillet at a base of the trailing edge.

According to an aspect of the disclosure, a gas turbine engine is provided and includes a turbine section in which high-temperature fluid is expanded to generate work and an IBR. The IBR is operably disposed in the turbine section whereby the blades aerodynamically interact with the high-temperature fluid and each radially outwardly facing surface is exposed to a hot gas path.

According to an aspect of the disclosure, an integrated blade rotor (IBR) is provided and includes a disc, blades integrally formed with the disc and radially outwardly facing surfaces of the disc. Each radially outwardly facing surface is disposed adjacent to a corresponding blade and includes leading and trailing wing sections that protrude fore and aft of the corresponding blade, outboard surfaces of the leading and trailing wing sections cooperatively defining a cylindrical plane about the disc from which the corresponding blade extends radially outwardly, inboard surfaces of the leading and trailing wing sections curving fore and aft from opposite sides of the disc and a curved profile which protrudes radially outwardly from the cylindrical plane along a chord length of the corresponding blade to a height which is about ⅓ a width of the disc.

In accordance with additional or alternative embodiments, each radially outwardly facing surface is adjacent to a pressure surface of the corresponding blade and has a concave profile in a circumferential dimension about the disc.

In accordance with additional or alternative embodiments, each radially outwardly facing surface includes a leading edge portion that blends tangentially with a leading edge fillet at a base of a leading edge of the corresponding blade and a trailing edge portion that blends tangentially with a trailing edge fillet at a base of a trailing edge of the corresponding blade.

According to an aspect of the disclosure, a gas turbine engine is provided and includes a turbine section in which high-temperature fluid is expanded to generate work and an IBR. The IBR is operably disposed in the turbine section whereby the blades aerodynamically interact with the high-temperature fluid and each radially outwardly facing surface is exposed to a hot gas path.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
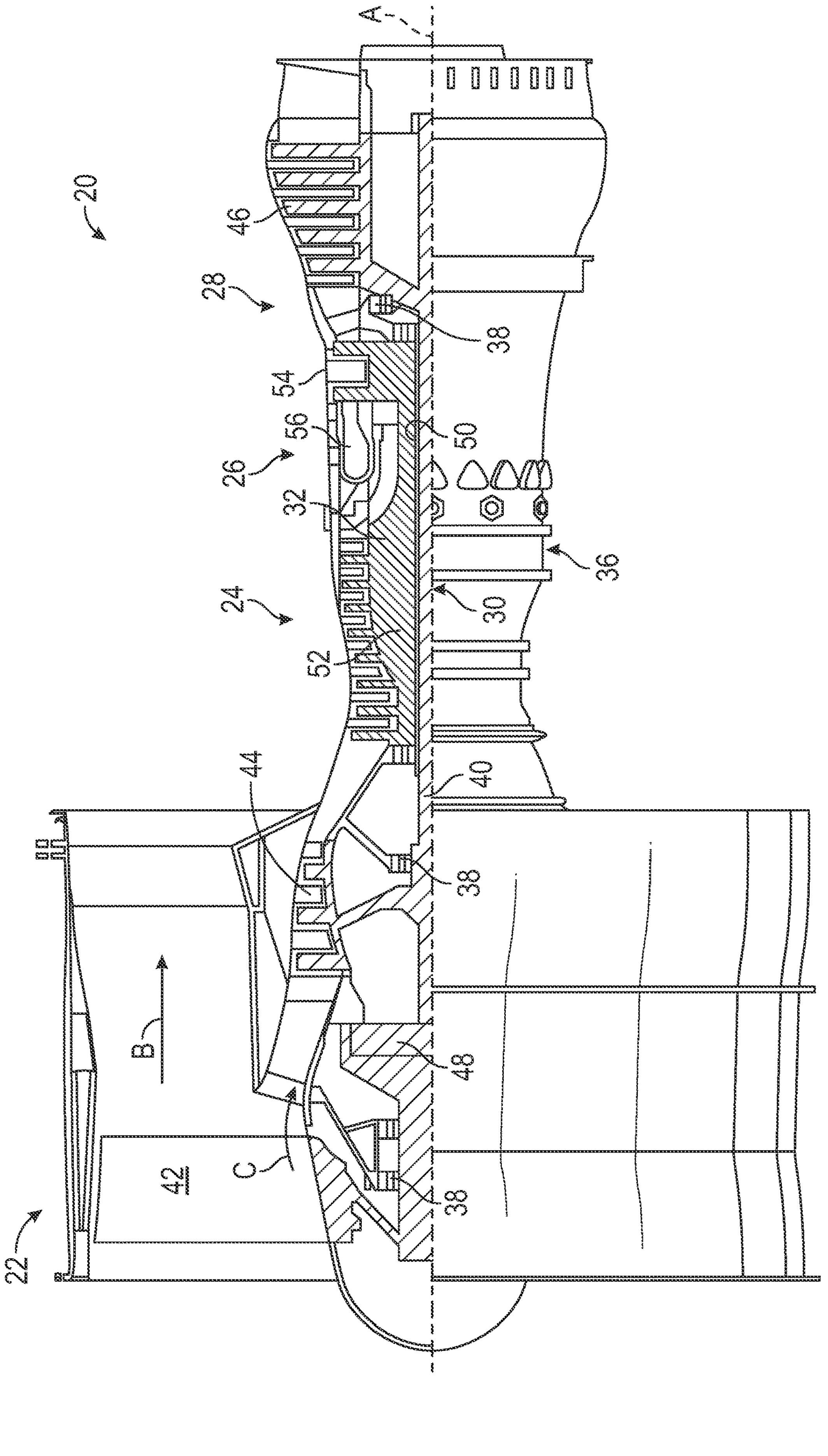
FIG. 1 is a partial cross-sectional view of a portion of an exemplary gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

In typical gas turbine engines, such as the gas turbine engine 20 of FIG. 1, the compressor can be regarded as a low-temperature region and includes integrated blade rotors (IBRs) whereas the turbine can be regarded as a high-temperature region and includes rotor discs in which blades can be disconnected from a disc. The IBRs of the compressor are rotational features characterized in that blades are integrally formed with a rotor element. The use of IBRs in turbines or other high-temperature regions as a replacement for rotor discs may improve manufacturability and reliability but has been found to result in high stress levels on the blades. These high stress levels are mainly concentrated at the leading and trailing edges of the blades and are caused by centrifugal forces combined with hot gas exposure.

Therefore, a need exists for an improved IBR design for a turbine-compatible IBR that does not result in high stress levels on the leading and trailing edges of the blades.

Thus, as will be discussed below, an IBR is provided for use in a high-temperature region of a turbine, such as a gas turbine engine. The IBR can be machined and includes a central portion or disc, blades integrally formed with the disc and surfaces between the blades in a circumferential direction. These surfaces are exposed to the hot gas path of the turbine and are characterized as having a cylindrical, curved and/or convex profile to minimize flow separation. The convex profile blends tangentially with cylindrical sections of the disc and, in particular, can be about ⅓ a width of the disc with reference to imaginary lines passing through leading and trailing edge radii.

Figure 3:
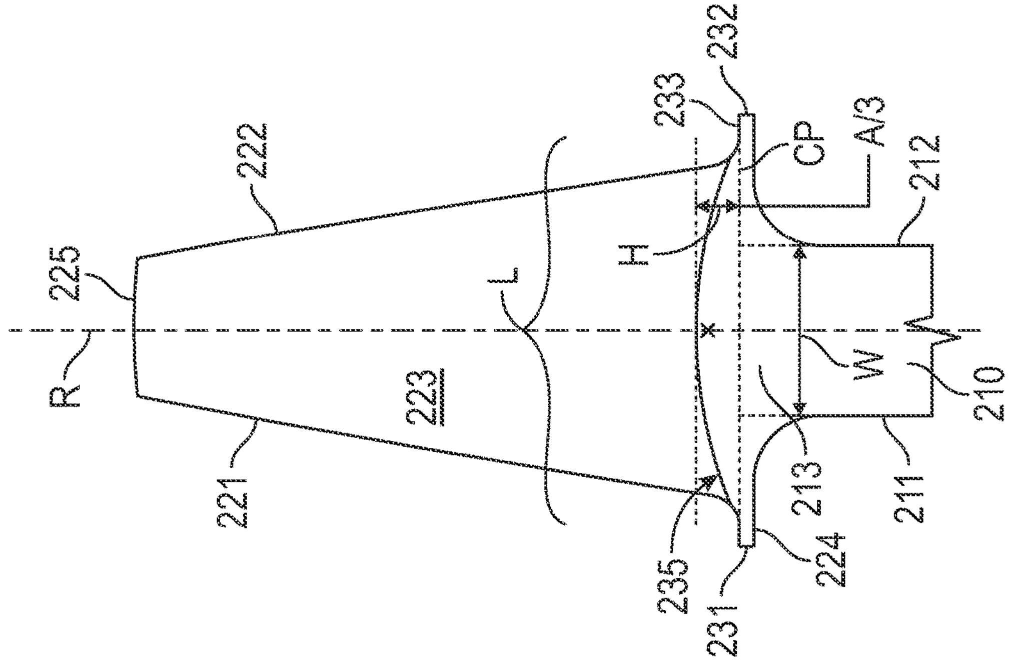
FIG. 3 is a side view of an IBR in accordance with embodiments.
Figure 2:
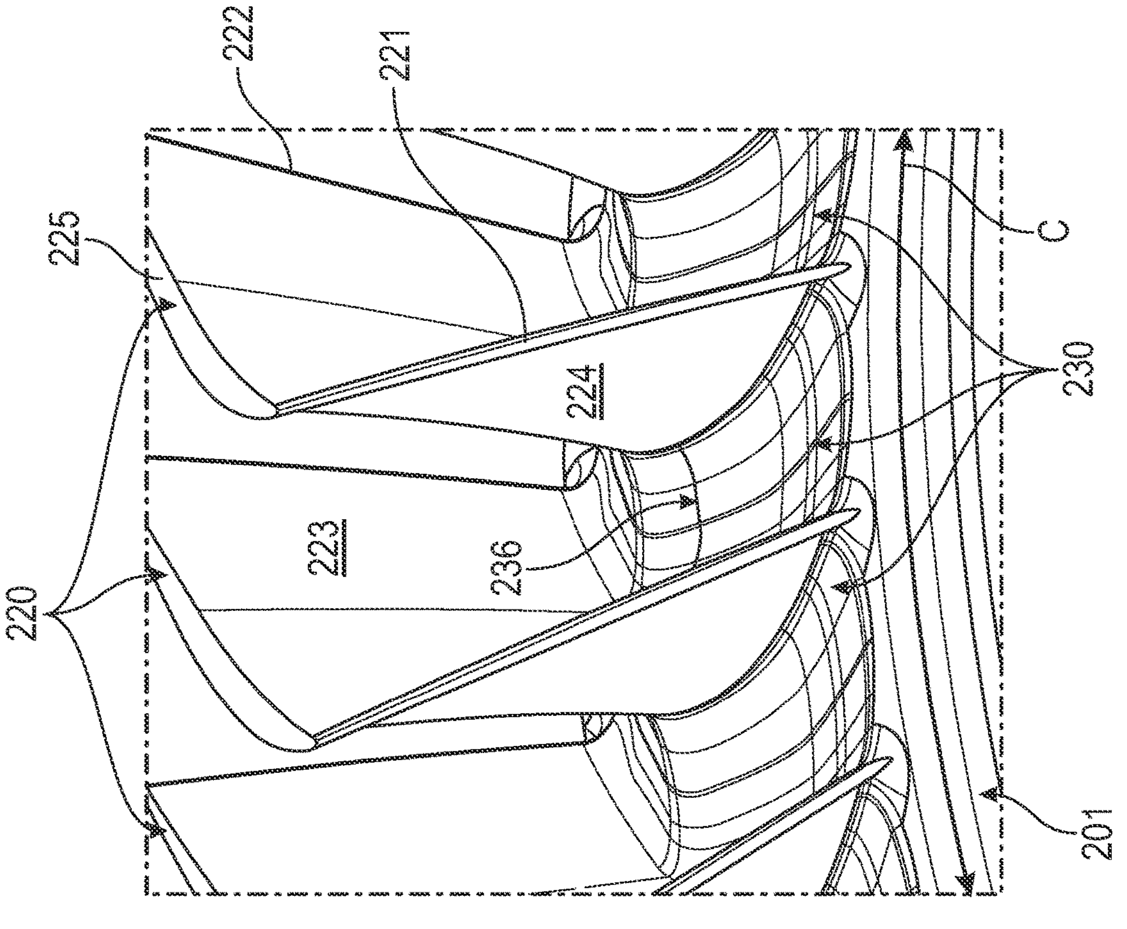
FIG. 2 is a perspective view of an integrated blade rotor (IBR) in accordance with embodiments.

With reference to FIGS. 2 and 3, an IBR 201 is provided and includes a disc 210, blades 220 that are integrally formed with the disc 210 and radially outwardly facing surfaces 230 of the disc 210. The disc 210 has a generally annular shape, opposite axial sides 211, 212 and a width W in the axial dimension D between the axial sides 211, 212. The radially outwardly facing surfaces 230 are provided at a periphery 213 of the disc 210. The blades 220 are arranged in a circumferential dimension C about the disc 210 and extend radially outwardly in a radial dimension R. Each blade 220 can have an airfoil shape with a leading edge 221, a trailing edge 222 opposite the leading edge 221, a pressure surface 223 extending from the leading edge 221 to the trailing edge 222, a suction surface 224, which is opposite the pressure surface 223 and which extends from the leading edge 221 to the trailing edge 222, and a blade tip 225. Each radially outwardly facing surface 230 is disposed adjacent to a pressure surface 223 of a corresponding blade 220 and extends in the circumferential dimension C to a suction surface 224 of a neighboring blade 220.

The IBR 201 can be formed from an initial block of material, such as metallic material or polymeric material for example, which is forged or machined.

Each radially outwardly facing surface 230 includes leading and trailing wing sections 231, 232. The leading and trailing wing sections 231, 232 have shared upper surfaces 233 and shared lower surfaces 234. The upper surfaces 233 of the leading and trailing wing sections 231, 232 cooperatively define a cylindrical plane CP about the periphery 213 of the disc 210. The corresponding blade 220 for each radially outwardly facing surface 230 extends radially outwardly from this cylindrical plane CP. The lower surfaces 234 of the leading and trailing wing sections 231, 232 curvilinearly taper toward the opposite axial sides 211, 212 of the disc 210. The leading and trailing wing sections 231, 232 extend axially beyond the leading and trailing edges 221, 222 of the corresponding blade 220.

Each radially outwardly facing surface 230 further includes a primary curved profile 235 (see FIG. 3) and a secondary curved profile 236 (see FIG. 2). The primary curved profile 235 protrudes radially outwardly from the cylindrical plane CP along a chord length L of the corresponding blade 220. In accordance with embodiments, a maximum height H that the curved profile 235 protrudes from the cylindrical plane CP is about ⅓ of the width W of the disc 210. The secondary curved profile 236 is a concave profile that extends in the circumferential dimension C between the pressure surface 223 of the corresponding blade 220 and the suction surface 224 of the neighboring blade 220.

Figure 4B:
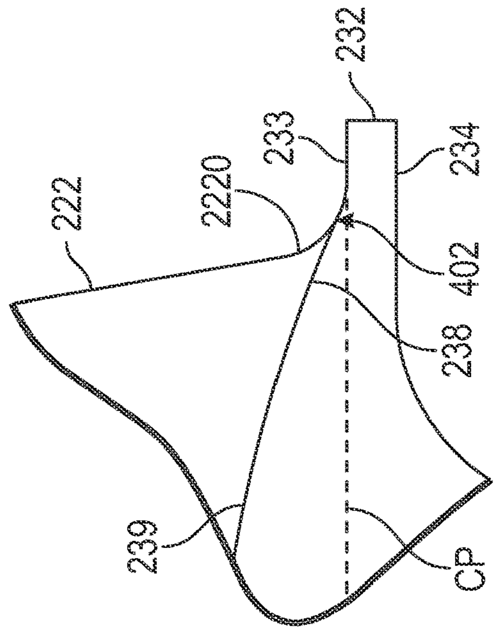
FIG. 4B is an enlarged side view of a trailing edge portion of a curved profile of a surface of an IBR in accordance with embodiments.
Figure 4A:
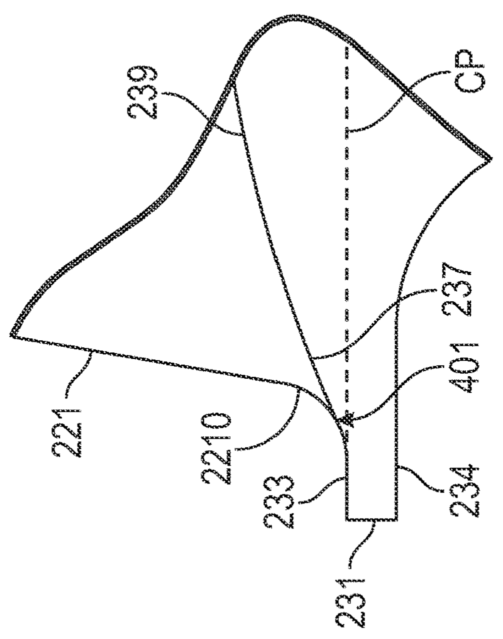
FIG. 4A is an enlarged side view of a leading edge portion of a curved profile of a surface of an IBR in accordance with embodiments.

With continued reference to FIG. 3 and with additional reference to FIGS. 4A and 4B, each radially outwardly facing surface 230 has a leading edge portion 237, a trailing edge portion 238 and a central portion 239 which is axially interposed between the leading edge portion 237 and the trailing edge portion 238 (the leading edge portion 237 is shown in FIG. 4A and the trailing edge portion 238 is shown in FIG. 4B). The leading edge portion 237, the trailing edge portion 238 and the central portion 239 cooperatively form the primary curved profile 235.

As shown in FIG. 4A, the leading edge portion 237 corresponds to the lead edge 221 of the corresponding blade 220 and blends tangentially with a leading edge fillet 2210 at a base of the leading edge 221 of the corresponding blade 220. That is, at the base of the leading edge 221, the leading edge fillet 2210 has a curvature 401 with a uniform or changing radius of curvature from the upper surface 233 of the leading wing section 231 and the leading edge portion 237 is formed to extend tangentially from this curvature 401. The trailing edge portion 238 blends tangentially with a trailing edge fillet 2220 at a base of the trailing edge 222 of the corresponding blade 220. That is, at the base of the trailing edge 222, the trailing edge fillet 2220 has a curvature 402 with a uniform or changing radius of curvature from the upper surface 233 of the trailing wing section 232 and the leading edge portion 238 is formed to extend tangentially from this curvature 402.

With increasing axial distance from the leading edge 221 of the corresponding blade 220, a curvature of the leading edge portion 237 (which is initially similar to the curvature 401 of the leading edge fillet 2210 allowing for the tangential blending) increases and then reverses direction whereupon the leading edge portion 237 connects with the central portion 239. With increasing axial distance from the trailing edge 222 of the corresponding blade 220, a curvature of the trailing edge portion 238 (which is initially similar to the curvature 402 of the trailing edge fillet 2220 allowing for the tangential blending) increases and then reverses direction whereupon the trailing edge portion 238 connects with the central portion 239.

Figure 5:
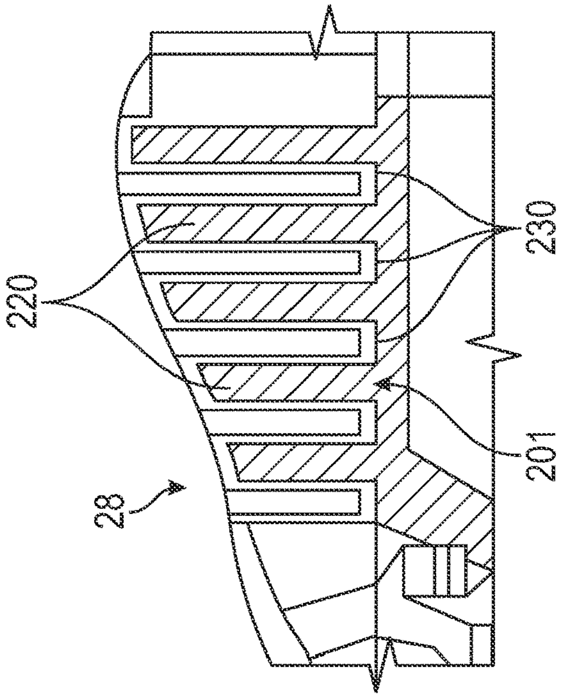
FIG. 5 is an enlarged side view of a turbine section of the gas turbine engine of FIG. 1 with IBRs installed therein in accordance with embodiments.

With continued reference to FIGS. 2, 3, 4A and 4B, with reference back to FIG. 1 and with additional reference to FIG. 5, the IBR 201 can be provided, for example, in the turbine section 28 of the gas turbine engine 20. As shown in FIG. 5, the blades 220 are positioned to aerodynamically interact with the high-temperature fluid flowing through the turbine section 28 and each radially outwardly facing surface 220 is thus exposed to a hot gas path.

Technical effects and benefits of the present disclosure are the provision of an IBR for use with a high-temperature region of a turbine. The surfaces of the IBR between the blades, which are exposed to the hot gas path of the turbine, are characterized as having a cylindrical, curved and/or convex profile to minimize flow separation. This leads to eliminations or reductions of high stress levels on the leading and trailing edges of the blades.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An integrated blade rotor (IBR), comprising:
a disc;
blades integrally formed with the disc; and
radially outwardly facing surfaces of the disc,
each radially outwardly facing surface being disposed adjacent to a corresponding blade and comprising a curved profile which protrudes radially outwardly from a cylindrical plane about the disc from which the corresponding blade extends radially outwardly.

2. The IBR according to claim 1, wherein a height of the curved profile is about ⅓ a width of the disc.

3. The IBR according to claim 1, wherein each blade has an airfoil shape and comprises:
leading and trailing edges; and
pressure and suction surfaces respectively extending between the leading and trailing edges.

4. The IBR according to claim 3, wherein each radially outwardly facing surface is adjacent to the pressure surface of the corresponding blade.

5. The IBR according to claim 4, wherein each radially outwardly facing surface has a concave profile in a circumferential dimension about the disc.

6. The IBR according to claim 3, wherein each radially outwardly facing surface blends tangentially with the leading and trailing edges.

7. The IBR according to claim 3, wherein each radially outwardly facing surface comprises:

a leading edge portion that blends tangentially with a leading edge fillet at a base of the leading edge; and a trailing edge portion that blends tangentially with a trailing edge fillet at a base of the trailing edge.

8. A gas turbine engine, comprising:

a turbine section in which high-temperature fluid is expanded to generate work; and an IBR according to claim 1, the IBR being operably disposed in the turbine section whereby the blades aerodynamically interact with the high-temperature fluid and each radially outwardly facing surface is exposed to a hot gas path.

9. An integrated blade rotor (IBR), comprising:

a disc;

blades integrally formed with the disc; and radially outwardly facing surfaces of the disc, each radially outwardly facing surface being disposed adjacent to a corresponding blade and comprising:

leading and trailing wing sections that cooperatively define a cylindrical plane about the disc from which the corresponding blade extends radially outwardly; and a curved profile which protrudes radially outwardly from the cylindrical plane along a chord length of the corresponding blade.

10. The IBR according to claim 9, wherein a height the curved profile protrudes from the cylindrical plane is about ⅓ a width of the disc.

11. The IBR according to claim 9, wherein each blade has an airfoil shape and comprises:

leading and trailing edges; and pressure and suction surfaces respectively extending between the leading and trailing edges.

12. The IBR according to claim 11, wherein each radially outwardly facing surface is adjacent to the pressure surface of the corresponding blade.

13. The IBR according to claim 12, wherein each radially outwardly facing surface has a concave profile in a circumferential dimension about the disc.

14. The IBR according to claim 11, wherein each radially outwardly facing surface blends tangentially with the leading and trailing edges.

15. The IBR according to claim 11, wherein each radially outwardly facing surface comprises:

a leading edge portion that blends tangentially with a leading edge fillet at a base of the leading edge; and a trailing edge portion that blends tangentially with a trailing edge fillet at a base of the trailing edge.

16. A gas turbine engine, comprising:

a turbine section in which high-temperature fluid is expanded to generate work; and an IBR according to claim 9, the IBR being operably disposed in the turbine section whereby the blades aerodynamically interact with the high-temperature fluid and each radially outwardly facing surface is exposed to a hot gas path.

17. An integrated blade rotor (IBR), comprising:

a disc;

blades integrally formed with the disc; and radially outwardly facing surfaces of the disc, each radially outwardly facing surface being disposed adjacent to a corresponding blade and comprising:

leading and trailing wing sections that protrude fore and aft of the corresponding blade;

outboard surfaces of the leading and trailing wing sections cooperatively defining a cylindrical plane about the disc from which the corresponding blade extends radially outwardly; and inboard surfaces of the leading and trailing wing sections curving fore and aft from opposite sides of the disc; and a curved profile which protrudes radially outwardly from the cylindrical plane along a chord length of the corresponding blade to a height which is about ⅓ a width of the disc.

18. The IBR according to claim 17, wherein each radially outwardly facing surface is adjacent to a pressure surface of the corresponding blade and has a concave profile in a circumferential dimension about the disc.

19. The IBR according to claim 17, wherein each radially outwardly facing surface comprises:

a leading edge portion that blends tangentially with a leading edge fillet at a base of a leading edge of the corresponding blade; and a trailing edge portion that blends tangentially with a trailing edge fillet at a base of a trailing edge of the corresponding blade.

20. A gas turbine engine, comprising:

a turbine section in which high-temperature fluid is expanded to generate work; and an IBR according to claim 17, the IBR being operably disposed in the turbine section whereby the blades aerodynamically interact with the high-temperature fluid and each radially outwardly facing surface is exposed to a hot gas path.

* * * * *